J. H. Belter,
Making Chair-Backs.

Nº 5,208.          Patented July 31, 1847.

AM. PHOTO-LITHO. CO. N.Y. (OSBORNE'S PROCESS)

UNITED STATES PATENT OFFICE.

JOHN H. BELTER, OF NEW YORK, N. Y.

MACHINERY FOR SAWING ARABESQUE CHAIRS.

Specification of Letters Patent No. 5,208, dated July 31, 1847.

*To all whom it may concern:*

Be it known that I, JOHN H. BELTER, of the city of New York and the county and State of New York, have invented a new and useful Machine for Cutting the Backs of Chairs, Sofas, &c., into Openwork; and I do hereby declare that the following is a full and exact description thereof, reference being had to the annexed drawings, making a part of this specification.

For the better understanding of the description it is necessary to state that the backs intended to be cut by the machine are made separately from the rest of the chair or sofa and are not attached to the other part until they have been cut into open work.

Figure 1:
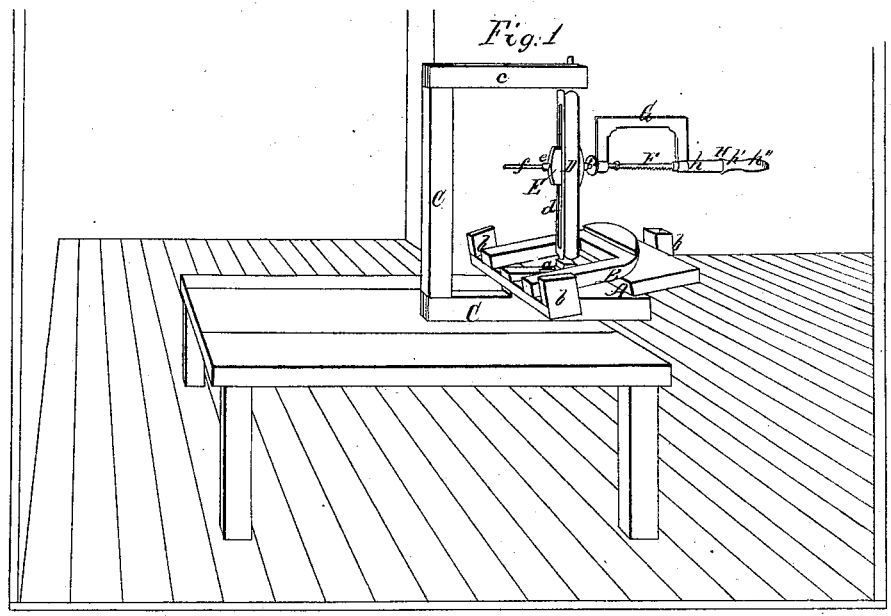
Figure 2:
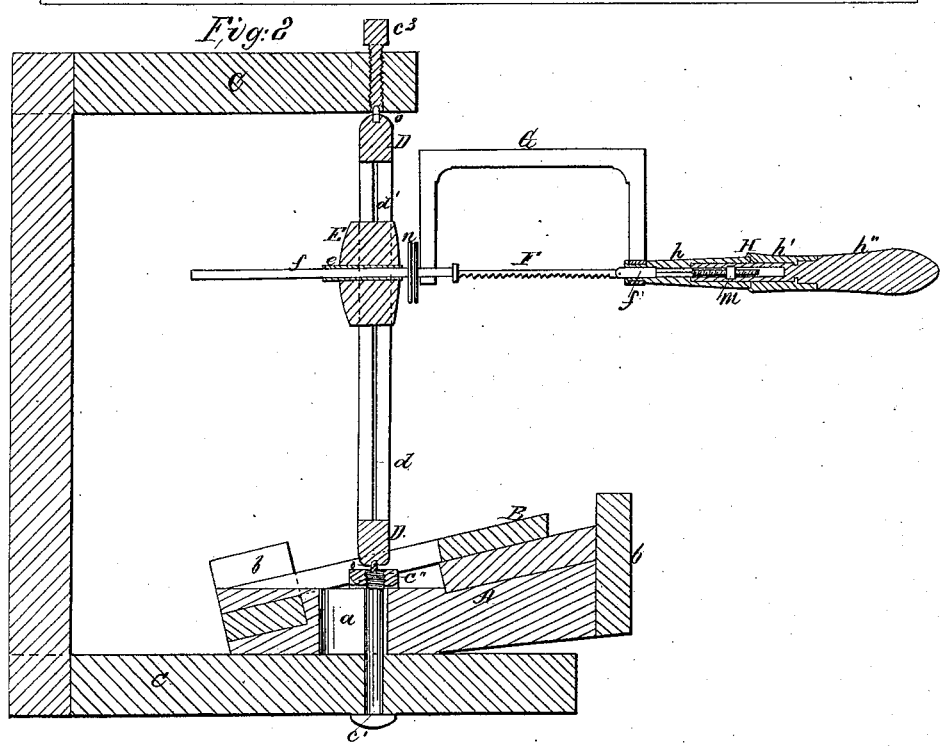

Figure 1 of the drawings is a perspective view of the machine and Fig. 2 a vertical and longitudinal section of it through the center as it is when prepared for cutting a chair back.

A a strong platform of wood called for distinction the supporting platform $a$ a slot in the platform to admit of its being moved in or out upon the frame C to which it is attached. B a model fastened upon platform; the exterior edge has the curve R form of the interior of the chair back at the lowest part or where the back is attached to the seat of the chair. $b, b, b$, pieces around the edges of the platform between which and the chair back wedges are driven to keep the latter firm while the operation of sawing out the figure is performed a frame consisting of one vertical and two longitudinal pieces or rails, strongly tenoned together. The lower rail is attached to the supporting platform by a bolt $c'$, which passes through the slot $a$ in the platform and is secured by a washer and nut $c''$. The upper rail is provided with an adjustable screw $c^3$ the use of which is to allow the piece D to be removed or replaced whenever it may be necessary. D an upright piece between the horizontal rails of the frame C having a slot $d$, in it extending nearly its whole length. The sides of the slot having grooves $d'$ in them which form guides for the block E. At the ends of this upright piece are pivots $o\ o'$ to admit of its turning around its longitudinal axis. The lower pivot rests in a socket in the end of the bolt $c$ and the upper one in a socket in the screw $c^3$. E a block which serves as a guide to the saw: it has a hole through it provided with a bush $e$ in which a rod $f$ connected with the saw blade freely slides. The block moves vertically in the slot $d$ and has projections upon its sides which extend into the grooves $d'$ of the slot. F the saw blade. It is secured one end to the rod $f$ passing through the block E and at the other end to a rod $f'$ extending into the handle of the saw; part of this latter rod is squared and part has a screw thread cut upon it the uses of which will be described hereafter. Each rod has a narrow slit or saw cut in it which receives the end of the blade and a pin is passed through both. At the commencement and sometimes during the process of cutting a back it is necessary to disconnect one end of the saw blade as will be seen when the operation of the machine comes to be described the pin that connects it with the rod $f'$ is therefore removable at pleasure. G a bow to keep the saw blade in line and give it stiffness. It has an eye at each end one of which receives the rod $f$ and the other the handle of the saw. H the handle of the saw, it is of three parts $h, h', h''$, one of these being metal and the others wood the parts $h\ h'$ are attached to each other and turn together and the part $h''$ may turn independently of the others when it is necessary. The metallic part $h$, passes through the eye of the bow G and is secured on each side by a collar leaving it free to turn in the eye. In the interior of this part is a square socket which receives the square part of the rod $f'$ so that when the whole handle is turned the saw blade turns with it. The part $h'$ of the handle has a socket that receives the part of the rod $f'$ upon which a screw thread is cut and there is let into the handle a slot $m$ through which the screw passes for the purpose of putting the necessary tension on the saw blade. The rod $f$ has a collar $n$ upon it which comes upon against the bow and keeps the blade from yielding when the handle is turned to give it tension; this collar is also used in connection with the handle to turn the blade the edge being milled that the thumb and finger may control it.

The machine is fastened to the work bench by the lower rail of the frame C leaving the movable parts to be adjusted as the work may require. It will be seen that the saw blade has three different motions besides its motion for cutting viz., a motion around its longitudinal axis by means of the handle H and the rod $f$; a vertical motion by means of the block E and a vibrating motion around the axis of the piece D by means of the points or pivots o, o'. These motions enable the workmen to saw in any direction and to follow the lines of the pattern laid out upon the back of the chair or sofa however irregular or complicated the figure may be.

The manner of using the machine is as follows, let us suppose that a chair back is to be cut; the back is placed in an upright position with lower edge upon the platform A and the curved side close against the model B and wedges are driven between it and the projecting pieces b b b on the edge of the platform to hold it firmly. The pattern or design for the open work is marked out on the convex side of the back and a hole is made with a gimblet or center-bit in some part of the figure the saw blade is disconnected from the rod f' and the end passes through the hole and again made fast to the rod and the workman proceeds to cut the back according to the figure marked upon it.

What I claim is—

The apparatus for guiding and steadying the saw while giving it any required angle to follow the pattern to be cut in combination with the adjustable platform and model support B the whole being constructed and arranged substantially as herein described.

J. H. BELTER.

Witnesses:
C. A. MAPES,
BENJ'N YATES.